F. W. STILWILL.
SHOCK ABSORBER.
APPLICATION FILED MAR. 24, 1917.
1,262,711.
Patented Apr. 16, 1918.
2 SHEETS—SHEET 1.
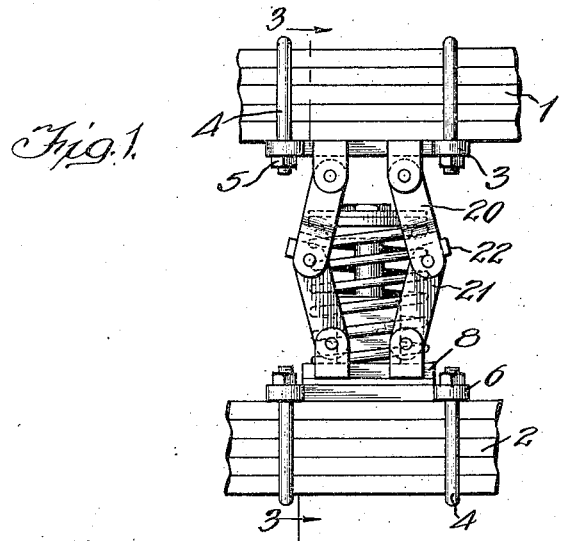
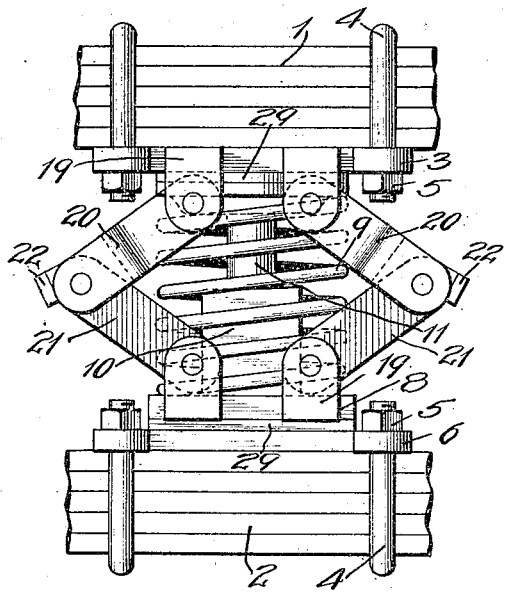
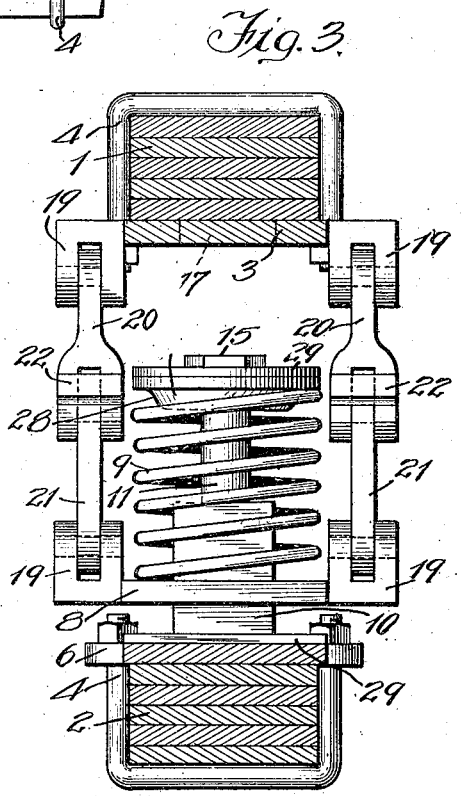
Witnesses:
W. P. Kilroy
Harry R. J. White
Inventor:
Fred W. Stilwill
By Miller Chindahl & Parker
Attys.

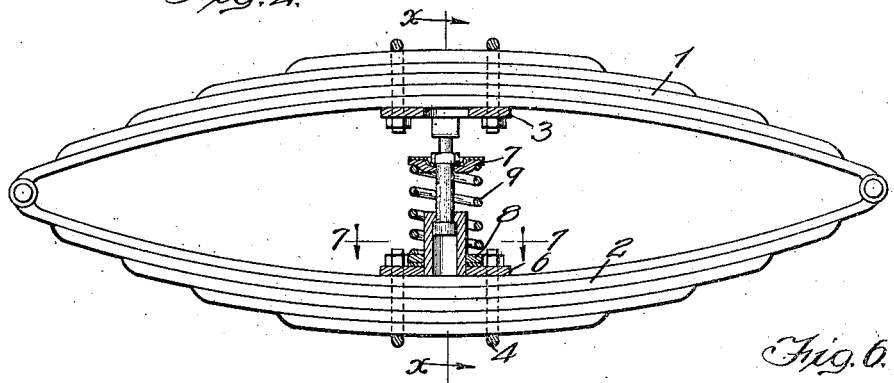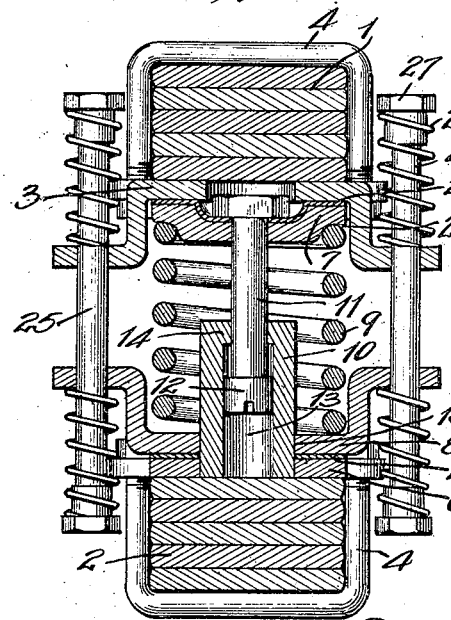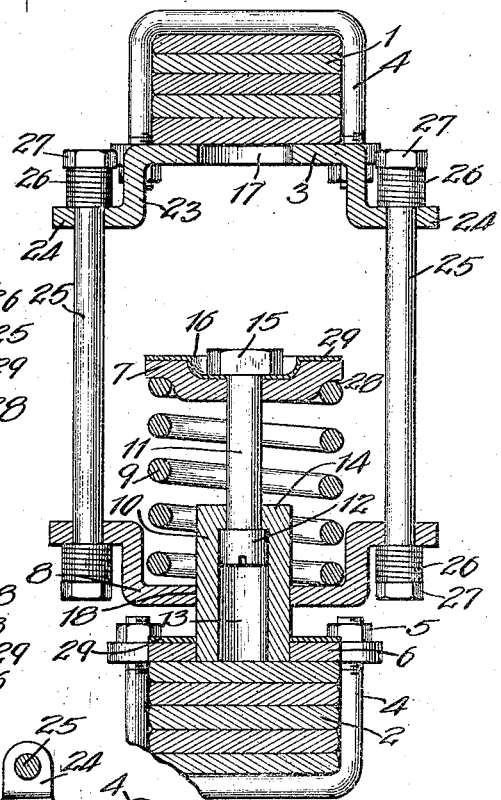

UNITED STATES PATENT OFFICE.

FRED W. STILWILL, OF CHICAGO, ILLINOIS.

SHOCK-ABSORBER.

1,262,711.

Specification of Letters Patent.

Patented Apr. 16, 1918.

Application filed March 24, 1917. Serial No. 157,070.

*To all whom it may concern:*

Be it known that I, FRED W. STILWILL, a citizen of the United States, residing at Chicago, in the county of Cook and State of Illinois, have invented certain new and useful Improvements in Shock-Absorbers, of which the following is a specification.

My invention relates to shock absorbers which are adapted to be applied to automobiles and the like and has for its object the production of a shock absorber which may be interposed between the chassis and wheels, the shock-absorbing element being compressed when the chassis and wheels approach each other or when they rebound.

Another object of my invention is to provide a shock absorber which may be applied universally to vehicles and other structures in which springs or other connecting means are employed.

In the accompanying drawings, I have shown the preferred embodiment of my invention and a modification thereof. Figures 1, 2 and 3 illustrate the preferred embodiment of my invention interposed between the sections of an elliptical spring. Fig. 1 is an elevational view showing the shock absorber in normal position. Fig. 2 is a similar view showing the spring sections contracted and the shock absorbing member compressed. Fig. 3 is a transverse elevational view taken on line 3—3 of Fig. 1 and similar to Figs. 1 and 2, but showing the spring sections in the rebound position, the shock absorbing member again being compressed. Figs. 4, 5, 6 and 7 are views showing a modification of the connecting means employed in the shock absorber. Fig. 4 is a side elevational view showing an entire full elliptical spring and the shock absorber interposed between the sections thereof, all of the parts being in normal position. Figs. 5 and 6 are sectional views taken on line $x$—$x$ of Fig. 4 and showing the parts in the same position as shown in Figs. 2 and 3, respectively. Fig. 7 is a plan view taken on line 7—7 of Fig. 4.

In the drawings, the full elliptical spring has its upper and lower sections indicated by the reference numerals 1 and 2 respectively. Herein I have shown an exterior top plate 3 suitably secured to the top spring section 1 as by a pair of U-shaped rods 4 and the nuts 5. An exterior bottom plate 6 is similarly secured to the lower spring section 2. An upper plate 7 and a lower plate 8 lie between the exterior plates 3 and 6 and approximately parallel thereto. Between the interior plates 7 and 8 is secured a shock absorbing compression spring 9.

The exterior top plate 3 is suitably secured to the interior bottom plate 8 by means to be hereinafter described. The interior top plate 7 is secured to the exterior bottom plate 6 by a telescoping connection. The bottom plate 6 has rising therefrom a guide member 10 of hollow and square cross-section (see Fig. 7). A piston or bolt 11 (see Figs. 5 and 6) having at one end a head 12 slidable in the hollow portion 13 of the guide member 10, is limited in its upward movement by the annular integral collar portion 14 formed by the contracted end of the guide. The other end of the piston is suitably secured to the interior top plate 7. Herein I have shown this top plate adjustably and slidably secured to the bolt, since the latter projects upwardly through the plate and carries a nut 15. Herein I have also shown the plate 7 recessed at 16 (see Fig. 6) and the nut seated therein. The plate 3 has a central hole 17 therethrough (see Figs. 4, 5 and 6) registering with the recess 16 in which the nut 15 is seated. These registering openings permit the plates 3 and 7 to abut against each other without the nut separating the plates.

The lower interior plate 8 has a hole 18 therein (see Figs. 5 and 6) which preferably is of the same outline as the hollow and polygonal cross-sectioned guide 10. The adjacent plates 6 and 8 are slidable but nonrotatably movable with respect to each other. The interior plate 8 is suitably connected to the top plate 3 in the following manner: Figs. 1 to 3, inclusive, show a toggle connection while Figs. 4 to 7 inclusive show a slidable connection. In Figs. 1, 2 and 3, the plate 3 and the plate 8 have inwardly extending projections or U-shaped ears 19 upon which the toggle links 20 and 21 are pivotally mounted. The upper links 20 have one end forked to receive one end of the lower links 21, the other end of said links being pivotally secured within the U-shaped projections 19. To prevent links from entirely straightening out, I provide each of the links 21 with a transversely extending stop lug 22 which bears against the forked ends of the links 20 and limits the inward and straightening movement of said links.

In Figs. 4 to 7 inclusive, I have shown a modified form of connection between the plates 3 and 8. In this modification the inwardly extending projections or ears 23 have perforated flanges 24 through which the bolts 25 are slidable. Each bolt upon its outer end carries a light compression spring 26 seated between the flange 24 and a nut 27.

From the drawings and foregoing description, it will be seen that the inwardly extending ears 19 or 23 form guides for the compression spring 9. The plate 7 has its under side suitably formed as at 28 to form an annular guiding seat for the spring. It will also be seen that when the spring sections 1 and 2 are compressed, the plates 3 and 7 and plates 8 and 6 are in contact whereby the spring 9 receives the compressional force directly. To minimize the impact, I have provided plates 6 and 7 with suitable buffers or cushioning devices 29 of rubber, fiber or other suitable material. When the spring sections are expanding, the spring 9 receives the tensional force through the toggle links or the bolts and the telescoping connection in a compressional form.

Although I have shown my invention applied to an elliptical spring, I would have it understood that the device may be used in connection with other types of carriage springs.

While I have herein described and illustrated my invention in considerable detail, I would have it further understood that I will be limited only by the scope of the appended claims.

I claim as my invention:

1. A shock absorber having, in combination, a pair of exterior plates, one of said plates having projecting ears and the other having a guiding hollow-telescoping projection, a pair of interior plates, one of said interior plates having projecting ears and an opening corresponding to said guiding projection and being non-rotatably slidable thereon, the other interior plate being abuttable against said exterior plate within the ears thereof, a spring between said interior plates and guided by said interior plate having ears, connecting means between said perforated plate and the exterior plate adjacent the other interior plate, and a telescoping connector between the other interior plate and the guiding exterior plate comprising the interior guiding surface formed by said hollow projection, a headed bolt slidable therein and limited in its movement by the contracted head of said projection and slidable through the other interior plate, and adjusting means securing said other interior plate to said bolt.

2. A shock absorber having, in combination, a pair of exterior plates, one of said plates having projecting ears and the other having a guiding hollow-telescoping projection extending inwardly, a pair of interior plates, one of said interior plates having inwardly projecting ears and an opening corresponding to said guiding projection and being non-rotatably slidable thereon, the other interior plate being abuttable against said exterior plate within the ears thereof, a spring between and guided by said interior plates, a connection between said perforated plate and the exterior plate having ears, and a telescoping connector between the other interior plate and the guiding exterior plate comprising the interior guiding surface formed by said hollow projection and a headed bolt slidable therein and limited in its inward movement by the contracted end of said projection, said bolt being secured to the other interior plate.

3. A shock absorber having, in combination, a pair of exterior plates, one of said plates having inwardly projecting ears and the other having a guiding projection extending inwardly, a pair of interior plates, one of said interior plates having projecting ears and an opening corresponding to said guiding projection and being non-rotatably slidable thereon, the other interior plate being abuttable against said exterior plate within said ears thereof, a spring between said interior plates and guided by said interior plate having ears, and connections between the interior plates and the exterior plate adjacent the other interior plate.

4. A shock absorber having, in combination, a pair of exterior plates, one of said plates having projecting ears and the other having a guiding projection, a pair of interior plates, one of said interior plates having projecting ears and an opening corresponding to said guiding projection and being non-rotatably slidable thereon, the other interior plate being abuttable against said exterior plate within the ears thereof, a spring between said interior plates and guided by said interior plate having ears, and a connection between said perforated plate and the exterior plate adjacent the other interior plate, and a telescoping connector between the other interior plate and the guiding exterior plate.

5. A shock absorber having, in combination, a pair of exterior plates, a pair of interior plates parallel therewith, means between said interior plates compressible when said exterior plates approach or recede from each other, a connection between one of said interior plates and the exterior plate adjacent the other interior plate, toggle-connecting means between the other plates comprising a pair of links pivotally secured to the other plates and pivoted to each other, and an abutment upon one of said links abutting against the other link to limit the movement of the links.

6. A shock absorber having, in combination, a pair of exterior plates, one of said plates having projecting ears and the other having a guiding hollow-telescoping projection extending inwardly, a pair of interior plates, one of said interior plates having inwardly projecting ears and an opening corresponding to said guiding projection and being non-rotatably slidable thereon, the other interior plate being abuttable against said exterior plate within the ears thereof, a spring between and guided by said interior plates, a toggle connection between said perforated plate and the exterior plate having ears, and a telescoping connector between the other interior plate and the guiding exterior plate comprising the interior guiding surface formed by said hollow projection and a headed bolt slidable therein and limited in its movement by the contracted end of said holow projection, said bolt being secured to the other interior plate.

7. A shock absorber having, in combination, a pair of exterior plates, one of said plates having a guiding projection extending inwardly, a pair of interior plates, one of said interior plates having an opening therethrough corresponding to said guiding projection and being non-rotatably slidable thereon, a spring between said interior plates, a toggle connection between the exterior plate adjacent the other interior plate and said interior plate, and a telescoping connector betwen said other plates.

8. A shock absorber having, in combination, a pair of exterior plates, one of said plates having inwardly projecting ears, a pair of interior plates, one of said interior plates having inwardly projecting ears, the other interior plate being abuttable against said exterior plate within said ears thereof, a spring between said interior plates, and guided by said ears on the interior plate, connections between said plates having ears, and a telescoping connector between the other plates.

9. A shock absorber having, in combination, a pair of exterior plates, one of said plates having a guiding projection extending inwardly, a pair of interior plates, one of said interior plates having an opening corresponding to said guiding projection and being non-rotatably slidable thereon, a spring between said interior plates, and connections between said interior plates and the exterior plate adjacent the other interior plate.

10. A shock absorber having, in combination, a pair of exterior plates, one of said plates having a guiding projection extending inwardly, a pair of interior plates, one of said interior plates having an opening corresponding to said guiding projection and being non-rotatably slidable thereon, and compressional means between said interior plates in concentric relation with respect to said guiding projection.

11. A shock absorber having, in combination, a pair of exterior plates, one of said plates having a guiding projection extending inwardly, a pair of interior plates, one of said interior plates having an opening corresponding to said guiding projection and being non-rotatably slidable thereon, a spring between said interior plates, a connection between said perforated plate and the exterior plate opposite the other interior plate, and a telescoping connector between the exterior plate having the projection and the other interior plate.

12. A shock absorber having, in combination, a pair of exterior plates, one of said plates having inwardly projecting ears, a pair of interior plates, one of said interior plates having inwardly projecting ears, the other interior plate being abuttable against the exterior plate within said ears thereof, compressional means between said interior plates guided by said inwardly projecting ears on the interior plate, a toggle connection between said plates having ears, and a connection between the other plates.

13. A shock absorber having, in combination, a pair of exterior plates, one of said plates having projecting ears and the other having a guiding projection, a pair of interior plates, one of said interior plates having projecting ears and an opening corresponding to said guiding projection and being non-rotatably slidable thereon, the other interior plate being abuttable against said exterior plate within the ears thereof, a spring between said interior plates and guided by said interior plate having ears, a toggle connection between said perforated plate and the exterior plate adjacent the other interior plate, and a telescoping connection between the other interior plate and the guiding exterior plate.

14. A shock absorber having, in combination, a pair of exterior plates, a pair of interior plates parallel therewith, means between said interior plates compressible when said exterior plates approach or recede from each other, a connection between one of said interior plates and the exterior plate adjacent the other interior plate, and toggle-link connections between the other interior plate and the other exterior plate.

15. A shock absorber having, in combination, a pair of exterior plates, a pair of interior plates parallel therewith, means between said interior plates compressible when said exterior plates approach or recede from each other, a telescoping connection between one of said interior plates and the exterior plate adjacent the other interior plate, and a toggle connection between the other plates.

16. A shock absorber having, in combination, a pair of exterior plates, one of said plates having a guiding projection extending inwardly, a pair of interior plates, one of said interior plates having an opening therethrough corresponding to said guiding projection and being non-rotatably slidable thereon, a spring between said interior plates, and connections between said interior plates and the exterior plate adjacent the other interior plate.

17. A shock absorber having, in combination, a pair of exterior plates, one of said plates having inwardly projecting ears, a pair of interior plates, one of said interior plates having inwardly projecting ears, the other interior plate being abuttable against said exterior plate within said ears thereof, a spring between said interior plates guided by said ears on the interior plate and an annular seat formed in the other interior plate, a connection between the exterior plate adjacent the other interior plate and said interior plate, and a connection between said other plates.

18. A shock absorber having, in combination, a pair of exterior plates, one of said plates having inwardly projecting ears, a pair of interior plates, one of said interior plates having inwardly projecting ears, the other interior plate being abuttable against the exterior plate within said ears thereof, compressional means between said interior plates guided by said inwardly projecting ears on the interior plate, a connection between said plates having ears, and another connection between the other plates.

19. A shock absorber having, in combination, a pair of exterior plates, one of said plates having inwardly projecting ears, a pair of interior plates, one of said interior plates having inwardly projecting ears, the other interior plate abutting against the exterior plate having inwardly projecting ears, compressional means between said interior plates and guided by said inwardly projecting ears, connections between said plates having ears, and other connecting means between the other two plates.

In testimony whereof, I have hereunto set my hand.

FRED W. STILWILL.

Copies of this patent may be obtained for five cents each, by addressing the "Commissioner of Patents, Washington, D. C."